United States Patent [19]

Johannesen

[11] 4,071,118

[45] Jan. 31, 1978

[54] VARIABLE ADJUSTER FOR DISC BRAKE

[75] Inventor: Donald Dixon Johannesen, South Bend, Ind.

[73] Assignee: The Bendix Corporation, South Bend, Ind.

[21] Appl. No.: 734,909

[22] Filed: Oct. 22, 1976

[51] Int. Cl.² ............................................. F16D 65/56
[52] U.S. Cl. ............................ 188/71.9; 188/196 BA; 192/70.25; 192/111 A
[58] Field of Search ........... 188/71.9, 196 B, 196 BA; 192/70.25, 111 A; 74/88, 577 M

[56] References Cited

U.S. PATENT DOCUMENTS

| 2,669,327 | 2/1954 | Chamberlain et al. | 188/71.9 |
| 3,261,434 | 7/1966 | Brucker | 188/196 BA |
| 3,392,805 | 7/1968 | Kreitner | 188/71.9 X |
| 3,967,705 | 7/1976 | Johannesen et al. | 188/71.9 |

FOREIGN PATENT DOCUMENTS

| 1,161,203 | 8/1969 | United Kingdom | 188/71.9 |
| 1,092,686 | 11/1967 | United Kingdom | 188/71.9 |

*Primary Examiner*—George E. A. Halvosa
*Attorney, Agent, or Firm*—Paul David Schoenle; Ken C. Decker

[57] ABSTRACT

A disc brake provides an adjustment mechanism to dispose a pair of friction elements in close proximity to a rotor by limiting the amount of retraction of the friction elements from the rotor. The adjustment mechanism has more than one rate of extension so that large clearances between the rotor and friction elements are reduced to a predetermined running clearance with few brake applications. In particular, a pawl engages a toothed member upon a brake application to rotate the toothed member, thereby extending an extensible member which limits retraction of the friction elements to a predetermined running clearance after a brake application. Keys on the pawl are engageable with the toothed member. These keys are radially disposed to each other so that different rates of rotation are provided for the toothed member thereby varying the rate of the extension of the extensible member.

3 Claims, 4 Drawing Figures

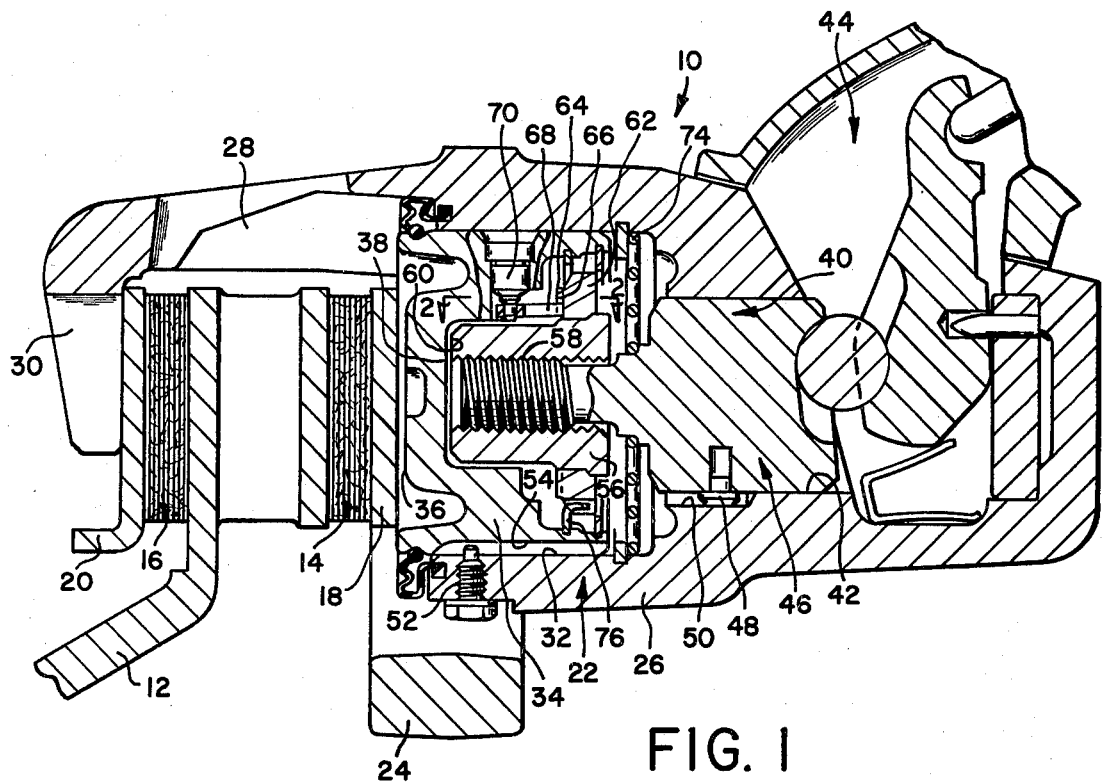
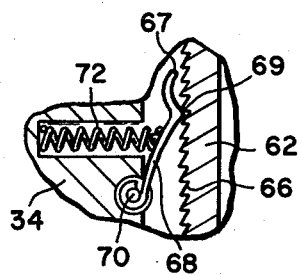
FIG. 2
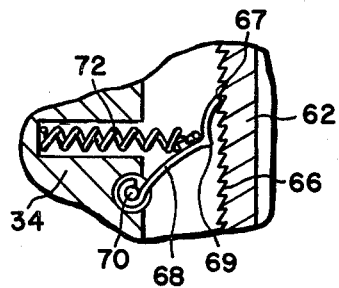
FIG. 3
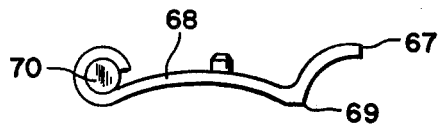
FIG. 4

VARIABLE ADJUSTER FOR DISC BRAKE

BACKGROUND OF THE INVENTION

This invention relates to automatic brake adjusters which dispose a pair of friction elements in close proximity to a rotor or disc. It is advantageous to maintain a small running clearance between the friction elements and the rotor so that braking is effected immediately after the brake pedal is applied.

Such a brake adjuster is disclosed in U.S. Pat. No. 3,967,705, which is owned by the assignee of the present invention.

The pawl and toothed member of the prior art brake adjusters are arranged so that upon brake application the pawl engages the toothed member and pivots relative thereto to rotate the toothed member which generally is secured to a threaded member. Rotation of the threaded member extends the member, thereby urging the piston closer to the rotor to consequently position the friction elements in close poximity to the rotor and limit the amount of retraction of the friction elements from the rotor.

With large clearances between the friction elements and the rotor, several brake applications were required to extend the extensible member enough to position the friction elements at an acceptable running clearance with the rotor.

SUMMARY OF THE INVENTION

The present invention is an improvement in the adjustment mechanism of U.S. Pat. No. 3,967,705, which positions a pair of friction elements in close proximity to a rotor. A caliper housing slidably mounts an extensible member and a piston, which is engageable with a friction element, to position the same element relative to the rotor. The extensible member is urged by a mechanical actuator into engagement with the piston to move the piston into engagement with a friction element to, in turn, move the friction element into engagement with the rotor to effectuate braking.

An adjustment mechanism extends the extensible member to move the piston and the friction element, which it engages, into close proximity to the rotor. In accordance with the invention, the adjustment mechanism comprises a pawl pivotally mounted on the piston and a toothed member secured to the extensible member. The pawl includes two keys that are each engageable with the toothed member.

With large clearances between either the rotor and the friction elements, or the one friction element and its corresponding piston, the extensible member must travel the large clearance before the friction elements are engageable with the rotor. The pawl on the piston is biased to pivot a radially outer key carried by the pawl into engagement with the toothed member on the extensible member. Movement of the extensible member relative to the piston, pivots the pawl and the radially outer key thereon to rotate the toothed member, thereby extending the extensible member. As the extensible member approaches the piston, a second or radially inner key on the pawl engages the toothed member to continue incremental rotation of the toothed member, but at a lesser rate in view of the shorter radius arm of the second key relative to the pivot of the pawl. At this time the radially outer key is disengaged from the toothed member so that only one rate of rotation is imparted to the toothed member at a given time.

With more than one key on the pawl, large clearances between the piston and extensible member result in the engagement of the radially outer key on the pawl with the toothed member to provide increased rotation of the toothed member, as the extensible member moves relative to the piston to take up the large clearance. Consequently, with the piston remaining in close proximity to the friction element in view of the sliding friction with the housing, the extensible member, which moves to urge the piston into engagement with the friction element and also moves the friction element via the piston into engagement with the rotor to effectuate braking, is disposed in close proximity to the piston.

The keys on the pawl are disposed at different radial positions to provide different rates of extension for the extensible member. In addition, the radially outer key is angularly disposed from the inner key when the radially inner key is engaging the teeth member, so that the outer key does not interfere with the movement imparted to the teeth member by the inner key.

DESCRIPTION OF THE DRAWINGS

FIG. 1 is a fragmentary, longitudinal, cross-sectional view of a mechanically actuated disc brake having an adjuster in accordance with the present invention.

FIG. 2 is a fragmentary, cross-sectional view taken along line 2—2 in FIG. 1.

FIG. 3 is a fragmentary cross-sectional view taken along line 2—2 in FIG. 1 when the clearance between the piston and extensible member is larger than normal.

FIG. 4 is an enlarged top view of the pawl of FIG. 1.

DETAILED DESCRIPTION

Referring now to the drawings, a disc brake generally indicated by the numeral 10 includes a rotor 12 having a pair of opposed friction faces 14 and 16. A pair of friction elements 18, 20 are mounted adjacent the friction faces 14, 16, respectively, and are adapted to engage the latter when a brake application is effected. A caliper housing generally indicated by the numeral 22 is slidably mounted on a fixed support member 24 by any appropriate mechanism well known to those skilled in the art, such as the mechanism disclosed in U.S. Pat. No. 3,388,774, owned by the assignee of the present invention. The fixed support 24 is bolted to a non-rotative portion of the vehicle, such as the vehicle spindle housing. As more completely disclosed in the aforementioned application, the friction element 18 is anchored on the fixed support or torque member 24.

The caliper housing 22 includes actuating portion 26 which extends substantially parallel to the friction face 14 of the rotor 12, a bridge portion 28 which traverses the periphery of the rotor 12, and an inwardly extending portion 30 which extends radially inwardly generally parallel to the friction face 16. The friction element 20 is secured to the inwardly extending portion 30.

The housing 22 defines a larger diameter bore 32 therewithin which slidably receives a piston 34. The front face 36 of the piston 34 engages the friction element 18 and the rear face 38 of the piston 34 is adapted to be engaged by an extensible member generally indicated by the numeral 40 which is slidably supported in a smaller diameter bore 42, but which projects into the larger diameter bore 32 as illustrated in the drawing. The extensible member 40 serves as a force transmitting link between the piston 34 and the mechanical actuator generally indicated by the numeral 44.

The extensible member 40 includes a first portion generally indicated by a numeral 46 which carries a projection 48 which engages a spline 50 provided in the wall of the bore 42 to thereby prevent rotation of the portion 46 with respect to the housing 22. Similarly, another projection 52 carried by the housing 22 extends into a spline 54 carried by the piston 34 to prevent rotation of the piston with respect to the housing. The extensible member 40 also includes a second portion 56 which is threadedly engaged with the portion 46 by threads 58. The portion 56 is consequently rotatable relative to the portion 46, and upon rotation in the appropriate direction, depending upon the pitch of the threads 58, rotation of the portion 56 will extend the length of the member 46. As can be seen in the drawing, the clearance between the end 60 of the portion 56 and the rear face 38 of the piston 34 is a relatively small amount, equal to the desired running clearance between the friction element 18 and the friction face 14. The portion 56 further includes a flange or toothed member 62 which projects radially from the piston 56, and which defines a face 64 which faces into the piston 34. Ratchet teeth 66 are provided on the face 64 and the ratchet teeth 66 are adapted to be engaged by a pawl 68 which is mounted on the piston 34 by a pivot 70. A spring 72 yieldably urges the pawl 68 into engagement with one of the ratchet teeth 66. Another spring 74 yieldably urges the extensible member 40 toward the predetermined brake release position illustrated in the drawing upon release of the actuating mechanism 44.

An anti-backlash spring 76 is also provided to prevent the extensible member 40 from "backing off" or returning to its original position after a brake adjustment has been effected.

In accordance with the invention, the pawl 68, as seen more clearly in FIGS. 2, 3, and 4, includes a first or radially outer key 67 and a second or radially inner key 69, which face the ratchet teeth 66. The keys 67 and 69 engage the teeth 66 separately as seen respectively in FIGS. 3 and 2, and impart movement or rotation to the second portion 56 of the extensible member via member 62, as the extensible member is moved toward the piston. This relative movement extends the axial dimension of the extensible member. When the key 67 is engaged to the teeth 66, the amount or rate of rotation of the second portion 56 is greater than when the key 69 is engaged to the teeth 66, because the key 67 moves through a greater arc as the pawl is pivoted about pivot 70 in view of the longer radius arm of key 67 relative to pivot 70.

Turning to FIG. 4, it is also shown that key 67 is angularly spaced from key 69 relative to pivot 70. This angular spacing enables the key 69 to cooperate with teeth 66 in the absence of interference from key 67, as illustrated in FIG. 2. Both keys form edges that are oriented normal to the radius arm extending from pivot 70 to each key so that the keys adequately engage the teeth 66 to impart rotation thereto.

MODE OF OPERATION

When a brake application is effected, operation of the actuating mechanism 44 urges the extensible member 46 to the left, thereby forcing the piston 34 and friction element 18 to the left to effectuate braking. Reaction forces acting through bridge 28 urge the friction element 20 into braking engagement with friction face 16. Upon release of the brake, the spring 74 returns the extensible member to the position illustrated in FIG. 1. However, the piston 34 and friction element will retract only a sufficient distance to relieve the braking force applied to the rotor 12.

When the stroke of the actuating mechanism 44 is increased due to either the lining of the friction elements wearing or clearances resulting from initial assembly, the spacing between the piston 34 and the extensible member 40 is increased. Consequently, either key 67 or key 69 of pawl 68 will engage teeth 66 of member 62. Depending upon the spacing between the piston 34 and the extensible member 40, the spring 72 will urge either key about the pivot 70 in a clockwise direction, viewing FIGS. 2 and 3. Thereafter, movement of the extensible member 40 toward the piston 34 will pivot the pawl about pivot 70 to cause rotation of toothed member 62 and portion 56 relative to portion 46 for incrementing or extending the extensible member, thereby shortening the stroke of the extensible member 40.

If the spacing between the piston and extensible member is such that the key 67 engages the teeth 66, movement of the extensible member toward the piston pivots the pawl 68 about pivot 70 so that key 67 rotates teeth member 62 and portion 56 relative to portion 46 to increment the extensible member thereby shortening the spacing between the piston and extensible member. As the extensible member moves closer to the piston 34, the key 67 moves upwardly and the teeth member 62 moves to the left viewing FIGS. 2 and 3 until the key 69 contacts the teeth member. Further movement of the extensible member 40 towards the piston 34 engages the teeth 66 with key 69 to provide rotation of the portion 56, but at a lesser rate than with key 67, and also pivots the key 67 out of engagement with the teeth member.

Releasing the brake moves the extensible member away from the piston to permit the pawl 68 to index to succeeding teeth. If the spacing upon brake release reaches that illustrated in FIG. 2, the key 69 will be indexed to succeeding teeth and the key 67 will be maintained in spaced relation to the teeth member 62. Successive reapplication of the actuating means increments the extensible member via key 69 until the clearance between the face 60 of the portion 56 and the rear face 38 of the piston 34 are maintained substantially constant.

The variable adjustment provided by pawl 68 is illustrated in conjunction with a disc brake 10, however, the variable adjustment can be adapted to a drum brake to maintain a running clearance between the shoes and the drum. Moreover, the specification states that the pawl 68 is connected to the piston 34 and the toothed member 62 is included with the portion 56; however, the pawl and toothed member could be disposed on the adaptive portion 56 and piston 34 to provide a variable rate of extension for the extensible member 40 in the same manner as aforementioned.

I claim:

1. In a disc brake, a rotor having a pair of friction faces, a pair of friction elements, one of said elements being disposed adjacent each of said friction faces, a fixed support, a caliper housing slidably mounted on said fixed support for urging the friction elements into braking engagement with their corresponding friction faces, and actuating means for causing said caliper housing to urge said friction elements into braking engagement with said friction faces, said actuating means including automatic adjustment means for limiting retraction of said piston to a predetermined running clearance, said adjustment means including an extensible member comprising a pair of relatively rotatable components, and a ratchet mechanism for rotating one of said components relative to the other component, said ratchet mechanism including a pivoting pawl and a toothed member for engagement by the pawl, said pawl including a pair of keys axially facing the toothed member and engageable therewith to rotate said one component a predetermined increment when one of said pair of keys engages the toothed member and a second predetermined increment when the other of said pair of keys engages the toothed member, caused by movement of said toothed member axially away from said pawl and said pair of keys being rotationally disposed to each other relative to the pivot of said pawl so that said pair of keys are engageable with the toothed member separately.

2. A disc brake comprising:

a rotor having a pair of friction faces;

a pair of friction elements, one of said elements being disposed adjacent each of said friction faces;

a fixed support;

a caliper housing slidably mounted on said fixed support and straddling said rotor, said caliper housing engaging each of said friction elements for urging the latter into braking engagement with the corresponding friction faces when a brake application occurs;

actuating means within said housing for urging said friction elements into braking engagement with their corresponding friction faces, said actuating means including an axially extensible member slidably mounted in said housing;

ratchet means extending said extensible member as the extensible member moves relative to said rotor; and a piston engageable with one of the friction elements and the extensible member, said ratchet means comprising a pawl and a toothed member which form a connection between the piston and the extensible member, said pawl substantially axially facing the toothed member and having more than one key substantially axially facing the toothed member and engageable separately therewith, and said ratchet means providing for different rates of extension for the extensible member as different keys engage the toothed member.

3. The disc brake of claim 2 in which said pawl is pivotally mounted between the piston and the extensible member, said pawl including two keys and the one key being radially outwardly and rotationally disposed from the other key relative to the pivotal mounting.

* * * * *